United States Patent [19]

Stephenson et al.

[11] Patent Number: 5,563,488
[45] Date of Patent: Oct. 8, 1996

[54] CONTROL OF SWITCHED RELUCTANCE MACHINES

[75] Inventors: John M. Stephenson, Leeds; William F. Ray, Nottingham, both of England

[73] Assignee: Switched Reluctance Drives Limited, Harrogate, England

[21] Appl. No.: 486,939

[22] Filed: Jun. 7, 1995

Related U.S. Application Data

[63] Continuation of Ser. No. 950,599, Sep. 24, 1992, Pat. No. 5,469,039.
[51] Int. Cl.$^6$ ..................................................... H02P 8/00
[52] U.S. Cl. ............................ 318/701; 318/138; 318/696
[58] Field of Search ................................. 318/700–832, 318/138, 245, 254

[56] References Cited

U.S. PATENT DOCUMENTS

| | | |
|---|---|---|
| 4,459,502 | 7/1984 | El-Antably . |
| 4,567,411 | 1/1986 | Reimann et al. . |
| 4,661,756 | 4/1987 | Murphy et al. ........................ 318/701 |
| 4,670,696 | 6/1987 | Byrne et al. . |
| 4,707,650 | 11/1987 | Bose ........................................ 318/685 |
| 4,739,240 | 4/1988 | MacMinn et al. . |
| 4,868,477 | 9/1989 | Anderson et al. . |
| 4,896,088 | 1/1990 | Jahns . |
| 4,896,089 | 1/1990 | Kliman et al. . |
| 4,933,620 | 6/1990 | MacMinn et al. . |
| 4,943,760 | 7/1990 | Byrne et al. . |
| 4,961,038 | 10/1990 | MacMinn et al. . |
| 4,990,843 | 2/1991 | Moren et al. . |
| 5,012,171 | 4/1991 | Sember . |
| 5,012,172 | 4/1991 | Sember . |
| 5,015,903 | 5/1991 | Hancock et al. ...................... 318/138 |
| 5,043,643 | 8/1991 | Hedlund et al. . |
| 5,075,610 | 12/1991 | Harris . |
| 5,084,662 | 1/1992 | Palaniappan et al. . |
| 5,097,190 | 3/1992 | Lyons et al. . |
| 5,097,191 | 3/1992 | Bahn . |
| 5,107,195 | 4/1992 | Lyons et al. . |
| 5,111,091 | 5/1992 | Bahn . |
| 5,113,113 | 5/1992 | Tepavcevic ............................. 318/701 |
| 5,138,244 | 8/1992 | Bahn . |
| 5,140,243 | 8/1992 | Lyons et al. . |
| 5,140,244 | 8/1992 | Lyons et al. . |
| 5,168,190 | 12/1992 | Bahn ....................................... 318/138 |
| 5,196,775 | 3/1993 | Harris et al. ........................... 318/638 |
| 5,278,482 | 1/1994 | Bahn ....................................... 318/701 |
| 5,281,903 | 1/1994 | Oku ........................................ 318/138 |
| 5,315,224 | 5/1994 | Zellman ................................. 318/701 |
| 5,341,076 | 8/1994 | Bahn ....................................... 318/254 |

FOREIGN PATENT DOCUMENTS 1597790  9/1981  United Kingdom .

OTHER PUBLICATIONS

Prof. D. A. Torry et al., Optimal–efficiency Excitation of Variable–Reluctance Motor Drives IEE Proceedings–B, vol. 138, No. 1, (1991).
Prof. P. J. Lawrenson et al., Variable Speed Switched Reluctance Motors, IEE Proceedings–B, vol. 127, No. 4, (1980).
IEEE Transactions on Industrial Electronics, vol. 41, No. 3, (1994), pp. 316–325.

*Primary Examiner*—Paul Ip
*Attorney, Agent, or Firm*—Patterson & Keough, P.A.

[57] ABSTRACT

A control system for and method of controlling a switched reluctance generator to maintain stable control of the generator in the continuous current mode. This is achieved by sensing the load on the generator, the speed of the rotor and the position of the rotor with respect to each phase winding in order to derive switching command signals to maintain the volt-seconds applied to the winding in each phase period so as to inhibit progressive flux growth in the phase windings by actuation of the controller switches.

20 Claims, 7 Drawing Sheets

(a) IDEALISED INDUCTANCE PROFILE $I_{PHASE}$ (b)

$\theta_{ON}$   $\theta_{OFF}$ $I_{PHASE}$ (c)

$\theta_{ON}$   $\theta_{OFF}$ $I_{PHASE}$ (d)

$\theta_{ON}$   $\theta_{OFF}$

CONTROL OF SWITCHED RELUCTANCE MACHINES

This is a continuation of application Ser. No. 07/950,599, filed Sep. 24, 1992, for CONTROL OF SWITCHED RELUCTANCE MACHINES.

FIELD OF THE INVENTION

This invention relates to the control of switched reluctance electric machines. The invention is particularly applicable to the control of a double salient pole switched reluctance machine when running at a high speed.

BACKGROUND OF THE INVENTION

FIGS. 1(a) to 1(c) illustrate a typical 3-phase switched reluctance (SR) machine and common electronic switching circuits which may be used to control the machine. The machine essentially consists of a stator s defining salient stator poles 1, 1', 2, 2', 3, 3', on which are wound phase windings w, of which only one is shown in association with the set of poles 2,2', and a rotor r with salient poles 4, 4', and 5, 5'. The electronic switching circuits are arranged to supply unidirectional currents to the phase windings w.

In both control circuits, each phase winding in the machine of FIG. 1(a) is associated with a circuit leg comprising at least one electronic switch t in series with each winding w across a dc supply (+/−).

The known means for controlling a switched reluctance machine include three characteristic regions which can be designated 'low', 'intermediate' and 'high' speed regions. These will be explained below. (For background see also for example 'Variable Speed Switched Reluctance Motors', by Prof. P. J. Lawrenson et al, IEE Proceedings—B, Vol.127, No.4, July 1980).

At 'low' speed the current is controlled by chopping. Two switching strategies are well known for chopping using circuits of the form of FIG. 1b.

In the first method, both switches t of a limb are switched together, so that at switch-off the current transfers from the switches to flow through the diodes d. In the second method, only one of the two switches t is opened, so that the current circulates, or 'freewheels', through one switch and one diode. Both switches are turned off at the end of a phase conduction period. Freewheeling is not possible with the circuit of FIG. 1c.

FIGS. 2(a) and (b) illustrate typical motoring and generating phase winding current waveforms, respectively, without freewheeling. The current is illustrated in relation to angle of rotation of the rotor with respect to the stator, (θ-theta).

Thus, at 'intermediate' speeds, the angle of rotation required for the growth and decay of flux is significant in relation to the phase period (defined as the angle of one cycle of phase inductance variation). The time rate of change of flux linkage is determined by the voltage applied to the winding and therefore the rate of change with respect to angle falls as the speed rises. At 'intermediate' speeds there is therefore only a single pulse of current in the switch(es) and diode(s) in each phase period. Corresponding phase winding currents are illustrated in FIGS. 3(a) and (b), respectively for motoring and generating operation. Operation in this manner is called the 'single-pulse' mode of operation. It should be noted that the 'conduction angle' ($\theta_c$-theta$_c$) in FIGS. 3(a) and (b) is the angle over which the switches are closed; $\theta_{on}$-theta$_{on}$ is the 'switch-on angle' and $\theta_{off}$-theta$_{off}$ is the 'switch-off angle'. Furthermore, the effect of the phase winding resistance has been assumed to be negligible in constructing the waveforms of FIGS. 3(a) and (b). The flux linkage waveform ($\psi$-psi) of the phase winding is illustrated by the broken lines. Following closing of the switches t in FIG. 1b associated with a phase winding, the flux linkage grows linearly. When the switches are opened, the flux linkage falls linearly, the current flowing through the diodes d imposing a voltage of $-V_S$ on the windings. (The operation of the circuit of FIG. 1c is the same, except that, following the opening of the switch, voltage $-V_H$ is impressed on the winding).

In order to maintain the torque developed by the machine as the speed rises under 'single-pulse' control, it is necessary to maintain the flux amplitude. This is commonly achieved by increasing the 'conduction angle' with speed.

Control in this 'single pulse' mode of operation with full torque capability, which may be related to a notional 'intermediate' speed range, is exercised by variation of the angle of a rotor pole relative to a particular stator pole at which the switches are closed (the 'switch-on angle') and the angle over which the switches remain closed (the previously mentioned 'conduction angle').

It will be apparent to the skilled person that, under the idealised, resistanceless assumptions behind FIGS. 3(a) and (b), if the conduction angle is made greater than half the complete phase period, the flux and current will fail to return to zero at the end of one cycle. This will lead to progressive uncontrolled growth of flux and current with successive cycles. This is acknowledged by the person skilled in the art to be a highly unstable condition.

As far as the inventors are aware, it has always been considered by the skilled person that such a situation is undesirable, ie. a conduction angle corresponding to half the phase period has been taken to be the upper limit on machine control. Indeed, it has been stated in the paper 'Optimal-efficiency excitation of variable-reluctance motor drives' by Prof. D. A. Torrey and Prof. J. H. Lang in IEE Proceedings-B, Vol. 138, No.1, January 1991 in discussing the optimum control strategy for a doubly salient pole variable-reluctance motor (here referred to as a switched reluctance motor) that, "Since $\theta_{cond}$=180° corresponds to a 50% duty cycle for the controllable switch, assuming no current chopping, a larger conduction period would result in the current building up in the phase from cycle to cycle, eventually being stopped by the current regulator, but rendering loss of control. This is clearly to be avoided."

It has been explained above that in order to maintain the torque as the speed rises, the 'conduction angle' is commonly increased with speed. However, because of the above imposed upper limit on the 'conduction angle' of half the phase period, the torque can only be maintained up to a certain speed. This is the upper limit of the 'intermediate' speed range. Operation is possible at higher speeds, in the 'high' speed range, but only at the expense of a decreasing torque capability because of the falling flux amplitude.

Thus, the operation of switched reluctance machines with conduction angles greater than half the phase period has been avoided in the known art, because this 'continuous current' mode is associated with an unstable flux growth and consequent highly unstable operating characteristics. However, the inventors of the present invention have recognised that exploitation of the 'continuous current' mode would enable the torque to be maintained in the 'high' speed region, thus avoiding the decrease in torque with speed explained above, if it were possible to control the machine stably in this mode.

SUMMARY OF THE INVENTION

It is an object of the present invention to provide stable control of a switched reluctance machine in the continuous current mode.

In practice the finite resistance in the windings and the impedance of the switches introduce voltage drops across them which increase with the current. This modifies the flux linkage/conduction angle graphs of FIGS. 3 (a) and (b) so as to impede the growth of flux for a given conduction angle. Nevertheless, as the conduction angle is increased (for a given dc supply voltage and speed) a point is reached where the net applied positive volt-seconds (time integral of dc supply voltage less the switch and winding resistance voltage drops) become greater than the net negative volt-seconds (time integral of dc supply voltage plus the diode and winding resistance voltage drops) in a cycle. The flux linkage and current in a phase winding then become continuous (i.e. do not fall to zero between cycles) and progressive growth of flux and current occurs. However the inventors of the present invention have found that stable operation is possible in this 'continuous current' mode by controlling the applied volt-seconds such that, under steady operating conditions, the net positive and net negative volt-seconds are of equal magnitude, the mean flux then being constant over successive cycles.

According to the present invention there is provided a switched reluctance machine control system for controlling a switched reluctance machine having a rotor with rotor poles, a stator defining one or more sets of stator poles and one or more phase windings each associated with a respective one of the sets of stator poles, the system comprising:

switch means;

control means operable to control the voltage across the phase windings by actuation of the switch means; and position sensing means arranged to provide the control means with an output signal indicative of the angular position of the rotor with respect to the stator;

characterised in that the control means are operable to control the machine in a continuous current mode of operation in which the current in each phase winding is non-zero throughout its phase period, the volt-seconds applied to the windings in each phase period being controlled by the control means in response to signals received from the position sensing means to inhibit progressive flux growth in the phase windings by actuation of the switch means.

In most practical embodiments of the invention, the control means are supplied with feedback signals which are dependent on the phase winding current and feedback signals which are proportional to the speed of rotation to aid stabilisation of operation in the continuous current mode.

Preferably, the system further comprises phase position determining means to which the output signal from the position sensing means is applied, and a comparator for each phase arranged to compare each sensed phase position, from the phase position determining means, with switching angle-based command signals and to generate a switch actuating signal when each phase position and the corresponding position of the switching angle-based command signal are coincident. By 'phase position' is meant a measure of the position of the rotor poles at any instant with respect to the stator poles of the respective phase, i.e. a measure at any instant of the position on the cyclic variation of a phase inductance with rotor position.

For the control means to be responsive to the speed of rotation of the rotor with respect to the stator, an appropriate signal can be derived from the signals from the position sensing means or may be independent speed-sensing means or could be derived from a knowledge of the current(s), the dc voltage and the switching conditions. The position sensing means may consist of a physical sensor or some form of 'sensorless' scheme for providing signals indicative of the angular position of the rotor with respect to the stator.

A signal related to the speed of rotation of the rotor can be derived separately by, for example, a tachogenerator or a light actuated sensor and a multi-slotted disc mounted on the rotor shaft arranged to break a light beam from a source to the sensor.

The control means may be operable to vary either the conduction angle of the switch means in the continuous current mode, or to modulate the applied voltage by the switch means during the conduction angle. In this latter case, the phase current may be either chopped, or the voltage pulse-width or pulse-frequency modulated. Alternatively, the voltage applied to each phase winding may be notionally divided into, say, two or more pulses, the width of one or more pulse being controlled while the other(s) is/are kept constant.

Preferably, the control law is derived from theory or empirically for a given machine and stored in a look-up table. Alternatively, the control commands in the form of switch actuation signals, based on angles of rotor relative to the stator, can be computed by a microprocessor in real-time in accordance with the appropriate input variables.

The system according to the present invention may be used to control the speed or torque of a switched reluctance motor or to control the generated voltage and/or current of a switched reluctance generator by enabling stable operation in the continuous current mode.

Also according to the invention there is provided a method of controlling a switched reluctance machine having a rotor with rotor poles, a stator defining one or more sets of stator poles and one or more phase windings each associated with a respective one of the sets of stator poles, the method comprising:

controlling the voltage across the phase windings by selectively actuating switch means;

sensing the angular position of the rotor with respect to the stator;

characterised by controlling the machine in a continuous current mode of operation in which the current in each phase winding is non-zero throughout its phase period, the volt-seconds applied to the windings in each phase period being controlled in response to the sensed angular position of the rotor to inhibit progressive flux growth in the phase windings by the said switching.

It has been found that it is possible to achieve stable control of the mechanical or electrical output power of a switched reluctance machine in the continuous current mode by eliminating the excess of net positive volt-seconds in relation to the net negative volt-seconds applied across the winding in the steady state. This can be achieved by control in a number of ways as mentioned above.

BRIEF DESCRIPTION OF THE DRAWINGS

The present invention can be put into practice in various ways one of which will now be described by way of example with reference to the accompanying drawings in which.

DETAILED DESCRIPTION OF A PREFERRED EMBODIMENT

Figure 1A:
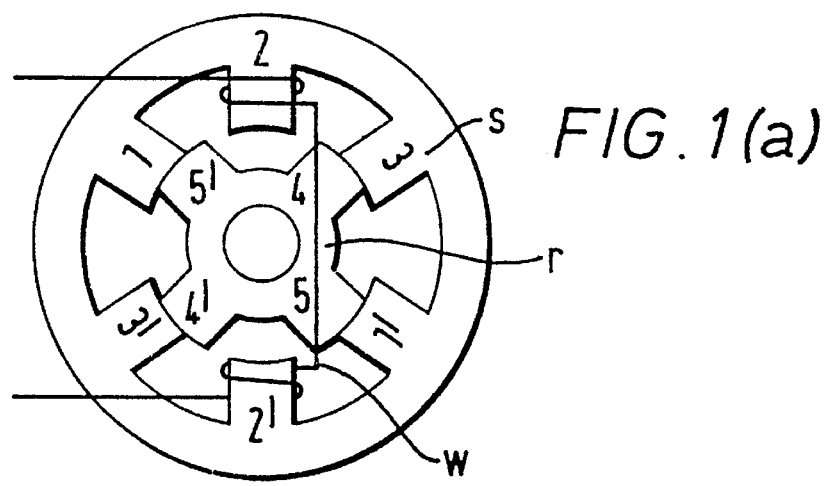
Figure 1B:
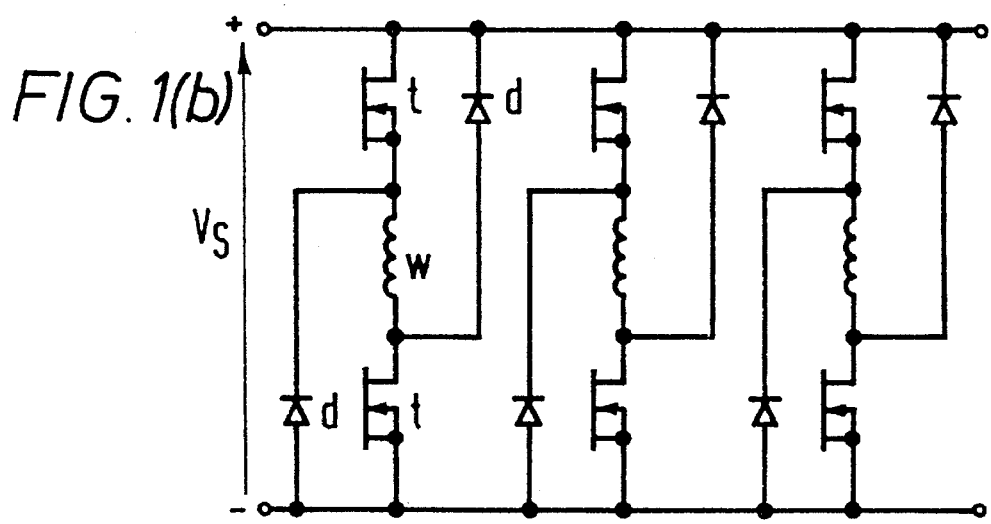
Figure 4:
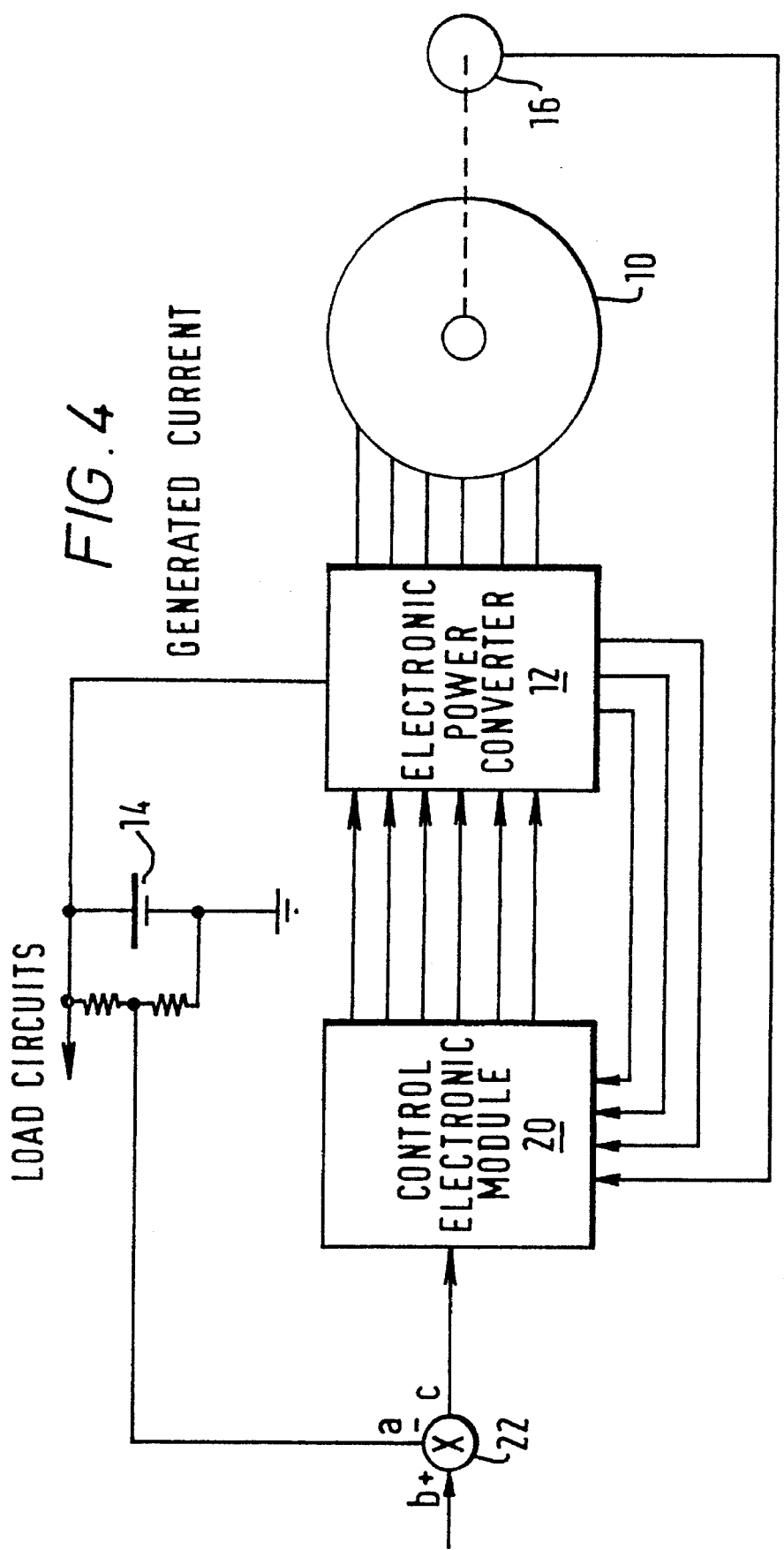
FIG. 4 is a schematic block diagram of a generator and control system according to the invention for a switched reluctance generator.

The control system illustrated in FIG. 4 is connected with a three-phase double salient pole switched reluctance generator 10 driven mechanically by a prime mover which is not shown. The generator has a conventional construction similar to that in FIG. 1(a). The output from the generator is connected with an electronic power converter 12 which includes a series of six transistor power switches t for the phase windings w of the generator in a configuration similar to that illustrated in FIG. 1(b), for example.

The output is supplied from the generator 10 through the power convertor 12 to load circuits (not illustrated) as a dc current and/or to charge a battery 14. A conventional angular position sensor 16 is mounted on the rotor shaft of the generator 10. The sensor 16 produces an output signal related to the angular speed and position of the rotor r relative to the stator s. In this example this signal consists of three rectangular wave signals, corresponding to the phases of the windings, each of which signals is constituted by a positive output voltage during the time a phase inductance changes, from, say, a maximum to minimum.

Figure 2A:
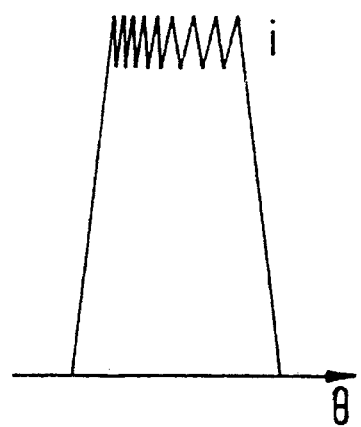

The actuation of the power switches t is controlled by an electronic control module 20. Signals proportional to the phase winding current are supplied to the control module 20 as a phase current feedback signal from the electronic power convertor 12 for each phase of the generator 10. These are used in a more or less conventional manner by the control module for generator output control in the chopping mode discussed earlier in relation to FIG. 2(a).

The system controls the output of the generator 10 in response to a demand or reference signal b for the battery voltage applied to a summing element 22. This is compared with a signal a related to the actual battery voltage in the summing element 22 to derive an error signal e to which the control module 20 responds to minimise it. Thus, if the battery voltage falls due, for example, to an increased load current, the error signal e will increase causing an increase in the generated current, such that the battery voltage returns to its reference level. Conversely at a given load current, if the generated current rises, the battery voltage will rise and the error signal will decrease, thus reducing the generated current such that the battery voltage returns to its reference level. (This assumes the generator is not already operating at its maximum output for a given speed). One preferred implementation of control by the module 20 includes proportional plus integral (P+I) action to eliminate the error in the steady state.

Figure 5:
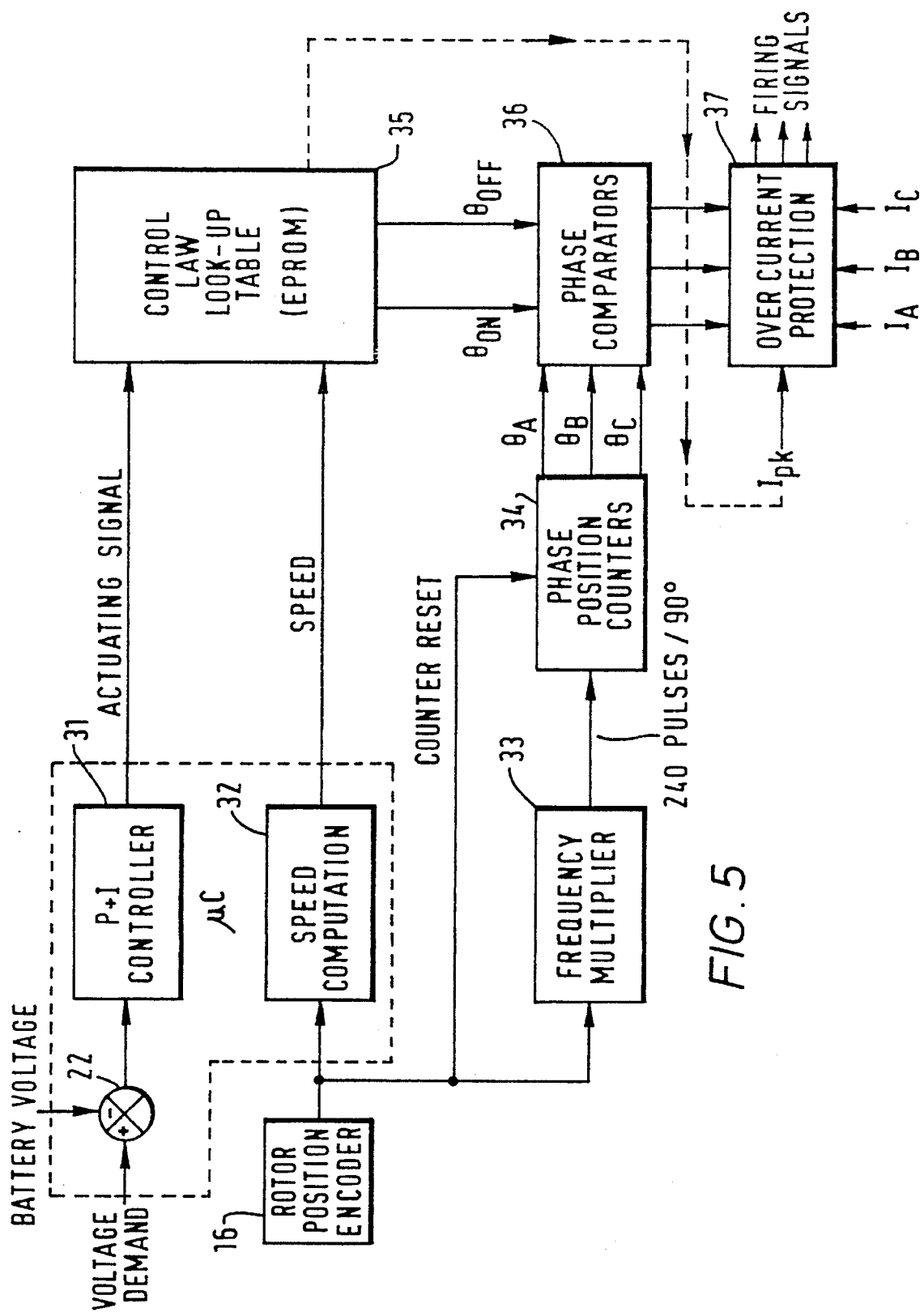
FIG. 5 is a more detailed block diagram of the control system in FIG. 4.

FIG. 5 is a schematic representation of the control module 20 for continuous phase current control of the switched reluctance high speed generator. It depicts the functional blocks for achieving switching angle control of, in this specific example, the three phases A, B and C. This circuit is equally applicable to a speed-controlled SR motor, when the inputs to the summing element 22 are replaced by the actual speed and demanded speed signals.

The rotor position encoder 16, mounted directly on the machine, provides a low-frequency pulse train containing accurate information on the angle of the rotor poles with respect to each stator pole and associated phase windings, as previously mentioned. This low-frequency pulse train is fed to a speed computation block 32 and a frequency multiplier 33. The signal is also used for resetting a phase position counter 34 for each of the generator phases.

The speed computation 32, the summing element 22 and the proportional plus integral (P+I) controller algorithm 31 are performed within a microprocessor device by suitable software code. The outputs from the microprocessor, being digital words representative of the actuating signal and the actual generator speed, are used to address an erasable programmable read only memory (EPROM) 35 which contains a control law look-up table. The stored data in the EPROM 35 represent the turn-on angle ($\theta_{on}$) and the turn-off angle ($\theta_{off}$) of the switches t as functions of speed and actuating signal. In order to obtain the benefits of continuous current operation, the stored data in the EPROM 35 include turn-on ($\theta_{on}$) and turn-off ($\theta_{off}$) angles which cause the switches to conduct for periods greater than 50% of the total phase period. The pre-programmed control parameters, which cover all the relevant conditions of machine speed and generated output current, are derived from the measured or predicted performance of the generator system.

$O_n$ and $O_{off}$ are generally functions of both actuating signal and speed, but they may be single functions of either actuating signal or speed. An example which illustrates the operation of the control loop for an SR generator is given in FIG. 8 in which $O_{off}$ is solely a function of speed and $O_{on}$ is solely a function of actuating signal. In this example $O_{off}$ is substantially constant but decreases slightly as speed increases to provide improved efficiency for the system. The particular characteristic will depend on the particular generator or motor design.

For a particular speed under steady operating conditions, $O_{on}$ will have been automatically adjusted by the action of the feedback control loop such that there is no successive build up of flux. This quiescent value of $O_{on}$ is shown as $O_q$ in FIG. 8. Due to the variation of $O_{off}$ with speed, the value of $O_q$ will also change with speed such that $O_c = O_{off} - O_q$ is approximately 50% of the total phase period, as aforementioned.

Figure 7:
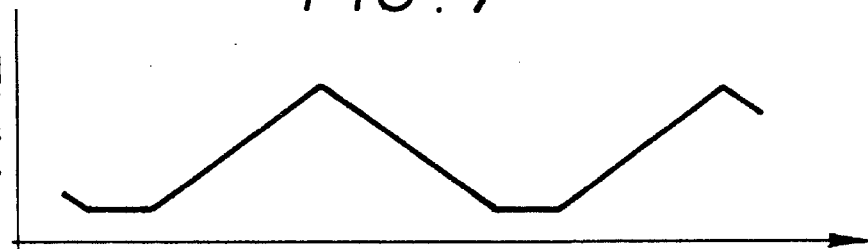
FIGS. 7(a) to (d) are graphs of phase current waveforms for steady state operating conditions illustrating control of the generator in FIG. 4.
Figure 7:
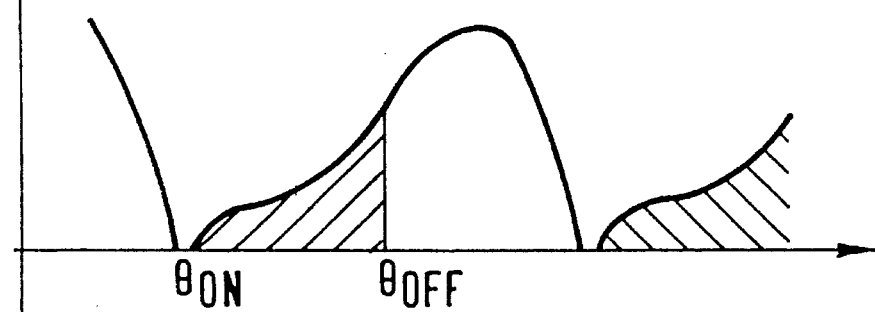
Figure 7:
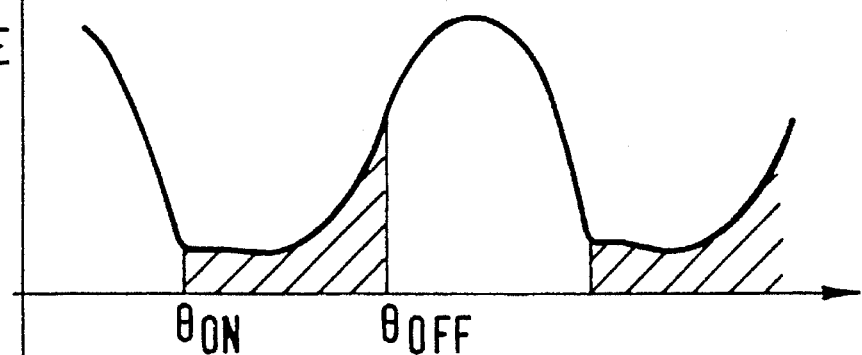
Figure 7:
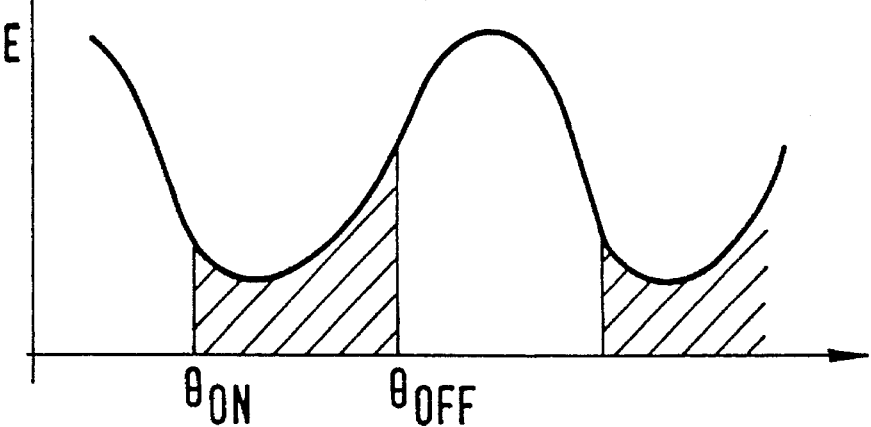

The steady state is illustrated in FIGS. 7 (a) to (d), in which three waveforms typical of one phase current at a constant speed are drawn in relation to an idealised phase inductance profile (FIG. 7 (a)) and assuming negligible phase resistance. FIG. 7 (b) represents a case just below the onset of continuous current, while the lower two waveforms FIGS. 7 (c) and (d) illustrate increasing generated output current with continuous current in the phase. The hatched section under the current curve marks the rising flux period, while the flux decreases over the remainder of the period. The net output current is the difference between the current-time areas (hatched and unhatched) averaged over the whole phase period. In each case the 'idealised' condition of equal on-time and off-time is maintained.

Figure 8A:
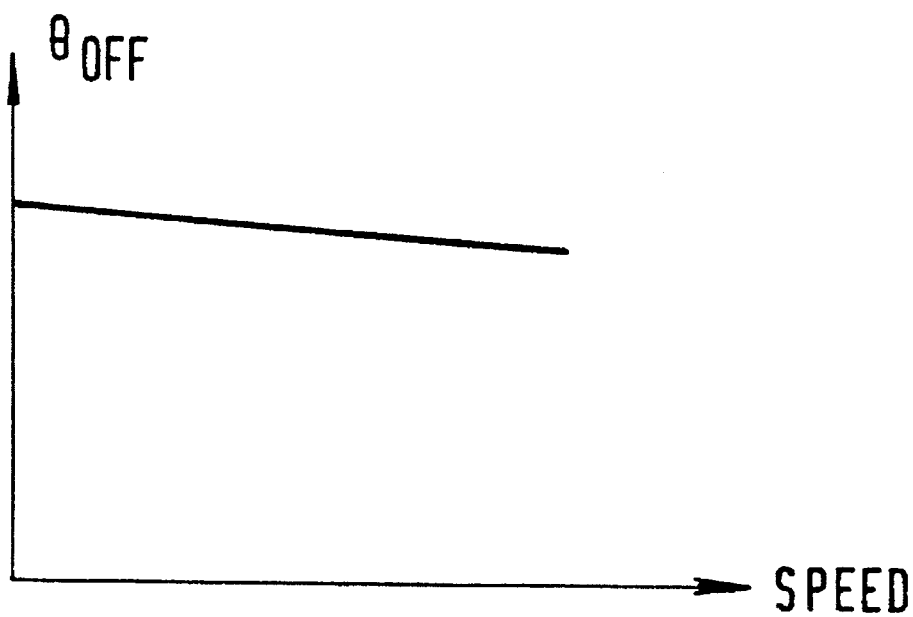
FIGS. 8(a) and (b) are graphs of control laws for continuous current operation.
Figure 8B:
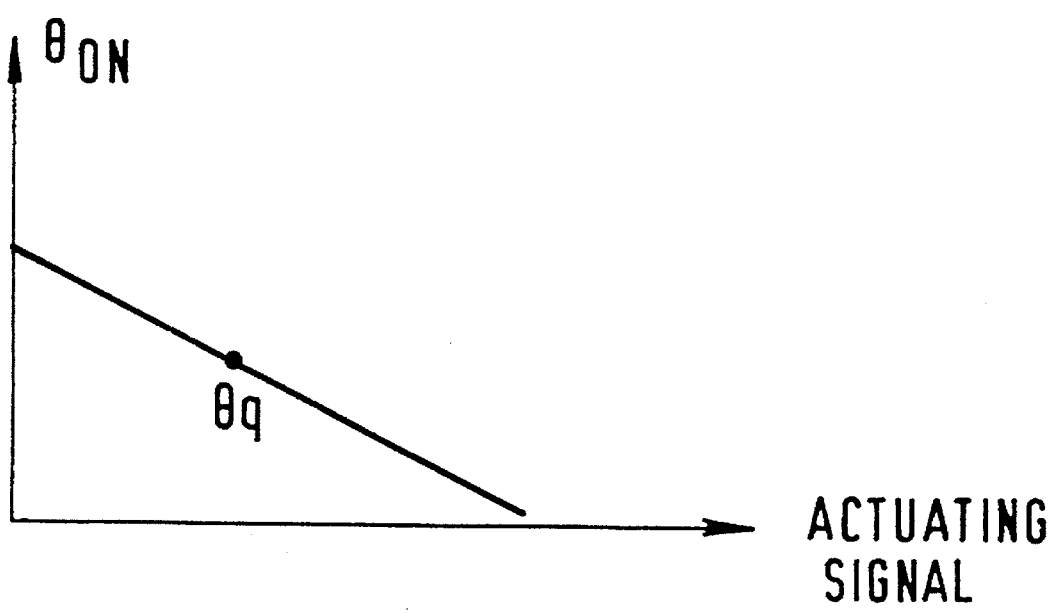

Now consider with reference to FIG. 5 that, due to an increase in load current, the battery voltage falls below the level set by the voltage demand signal. Due to the action of the P+I controller (31) the actuating signal will increase and as a result, with reference to FIG. 8, the value of $O_{on}$ reduces. The value of $O_c(=O_{off}-O_{on})$ will thereby exceed its quiescent value and the flux and current in the generator phases will build up successively until the current supplied to the battery exceeds the level of the new load current and the battery voltage rises above the voltage demand value. The error signal will then reverse polarity and the P+I controller will reduce the actuating signal. With reference to FIG. 8 the value of $O_{on}$ will then increase until $O_{on}$ again becomes equal to its quiescent value of $O_q$ or to such new value of $O_q$ as is necessary to maintain the battery voltage at its voltage demand level at the new (increased) load current.

The overall effect is that the values of the actuating signal and $O_{off}$ undergo a transient change subsequently returning to this quiescent value (which will be substantially unchanged) whilst the generator current increases from its previous average level to a higher average level to supply the increased load current drawn from the battery.

To provide appropriate damping to this transient response of the control loop, as is well known to persons skilled in the art of automatic feedback control, it may be necessary to provide dynamic compensation in addition to the P+I compensation shown in FIG. 5. The design of this compensation follows well known laws and is not the subject of the invention. The type of compensation will vary depending on the particular application. The example given above is for an SR generator for which the controlled variable is battery voltage. However the system may be an SR motor for which the controlled variable is motor speed.

The frequency multiplier 33 processes the low-frequency rotor position pulse train and produces a high-frequency pulse train, which is phase locked to the incoming low-frequency rotor position signal. The high-frequency pulse train is required to have sufficient pulses per 90° of rotation of the rotor to give the necessary fineness of control of the switching angles. The pulse interval of the high-frequency pulse train determines the resolution of the control angles. For example, in this 6 stator/4 rotor pole generator system the low-frequency pulse train contains 3 pulses per 90° of rotor rotation. This frequency is multiplied by a factor of 80 to give a high-frequency pulse train so that 240 pulses occur within a rotor rotation of 90°, giving a switching angle resolution of 0.375°. One practical method of implementation is the subject of GB Patent 1597790, the teaching of which is incorporated herein by reference.

Figure 6:
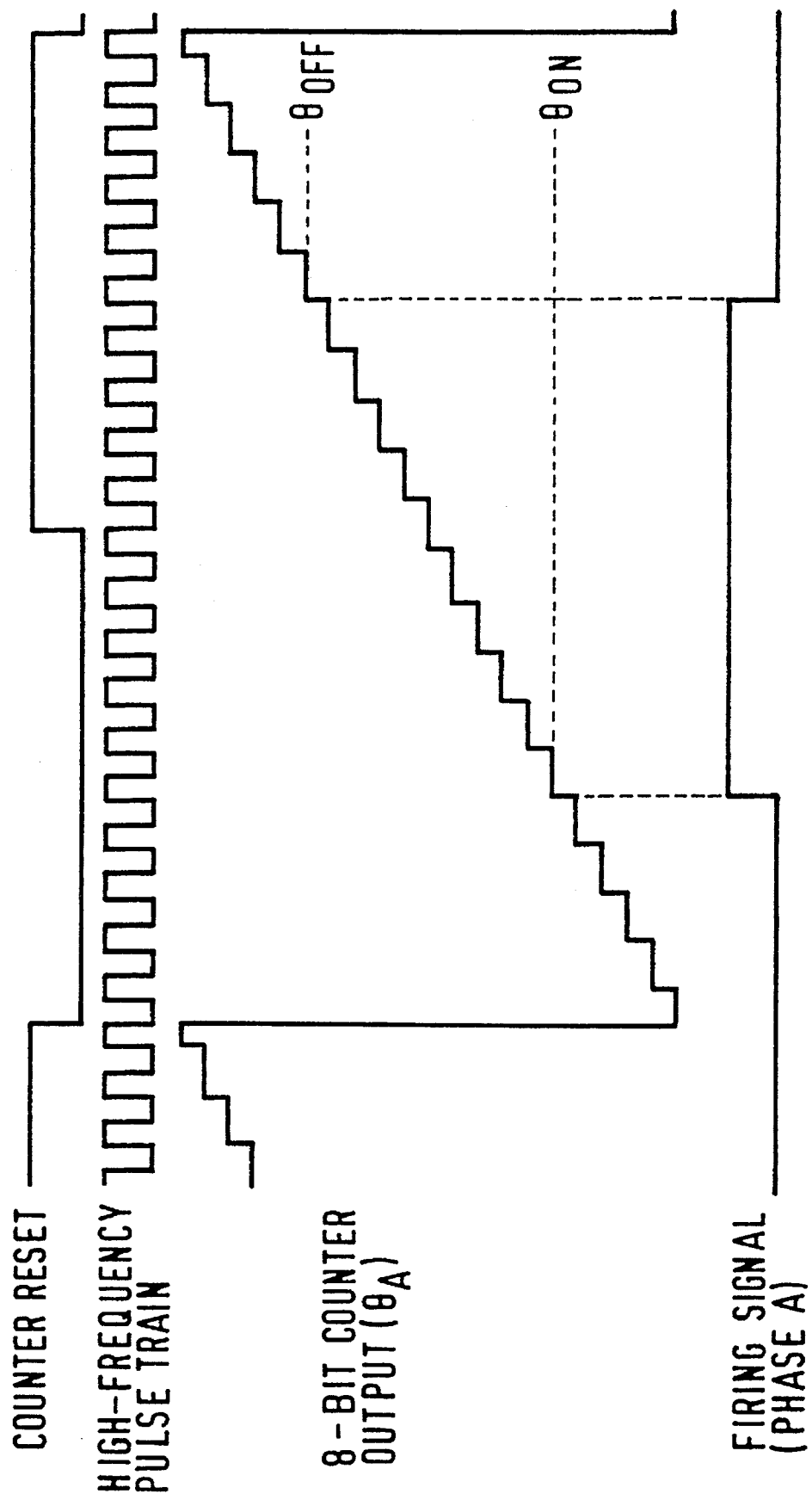
FIG. 6 is a timing diagram of the control system output signals.

The phase-synchronised high-frequency pulse train is used to clock three individual phase position counters 34, each for a respective phase of the generator. FIG. 6 illustrates the timing diagrams for one of the phase counters 34, and the output firing signals from the corresponding phase comparator 36. The phase position counter 34 is reset and the counting initiated by the low-frequency pulse train edge at a known rotor pole angle with respect to the particular phase axis. In the specific case of the 6/4 pole switched reluctance generator, each phase position counter 34 is reset at the minimum phase inductance position, when the angular mid-position of one of the rotor poles is 45° offset from the respective mid-phase position.

The counter outputs are compared digitally with the turn-on angle ($\theta_{on}$) and turn-off angle ($\theta_{off}$), derived from the EPROM 35, in the phase comparator 36. This comparison yields the firing signals for the power converter power switching devices t, as shown in FIG. 6. The counter is reset by the unmultiplied output of the rotor position encoder 16 and then counts at the frequency of the output of the frequency multiplier 33. For a given speed/load combination, the phase comparator is supplied with values of switch turn-on and turn-off command angles from the EPROM 35. When the counter 4 reaches the count related to the switch turn-on phase angle, the comparator 36 generates a firing signal for that phase. The count continues until it reaches a value indicative of a phase angle coincident with a value for switch turn-off from the EPROM 35.

The firing signals are processed, prior to interfacing with the power converter 12, by an over-current protection element 37. This monitors the individual switch currents $I_A$, $I_B$, $I_C$ and compares them with a specific peak level $I_{pk}$ which represents the peak current in the switch t in FIG. 1. If the phase current exceeds the maximum desired peak level $I_{pk}$ the switch is turned off irrespective of the value of $O_{off}$ supplied by the EPROM 35. It is also possible to use this over-current protection element 37 to control the output of the generator by storing a variable current chopping level ($I_{pk}$) in the control look-up table EPROM 35. The value of the output from the EPROM 35 ($I_{pk}$) is then variable in response to the speed and actuating signal levels. In this case $I_{pk}$ is provided to the overcurrent protection element 37 by the EPROM 35 a shown by the broken line in FIG. 5.

The electronic control module 20 shown in FIG. 4 can also be programmed for use in the low-speed region for conventional chopping control, where the peak current level $I_{pk}$ is a variable stored in a separate look-up table which is addressed by an actuating signal and the machine speed signal. This is not the subject of this invention.

At intermediate speeds the output current is controllable by adjustment of the switch-on and switch-off angles according to the well known single pulse control mode. The optimum combination of angles and/or chopping level at any given speed and demanded output current is stored in the control module 20. The signal corresponding to the angular speed of the rotor is derived from the signal from the sensor 16.

Thus, it is possible to adjust optimally the switch-on and conduction angles and the chopping level according to predetermined stored characteristics in the form of look-up tables.

The control system of the present invention controls the generator output in the continuous current mode, i.e. at higher powers at high speeds, in which the flux linkage and current in each phase winding do not fall to zero between phase periods. This is now possible as the stable system operation in the continuous current mode is based on the speed and battery voltage feedback signals. Thus, the power which can be generated at higher speeds is considerably increased by operation of a switched reluctance machine in the continuous current mode.

The overall function of the digital control system is to regulate the battery voltage to a level dictated by the voltage demand signal, irrespective of load variations and changes in generator speed. This is achieved by varying the power switch firing signals by $\theta_{on}$ and $\theta_{off}$, and thus generating the necessary system output current. At higher speeds, as the output current demand increases, the phase current will start to flow continuously. The closed loop control ensures that stable operation is maintained over the whole operating range including the continuous phase current region.

Although only one illustrative embodiment of the invention has been described in detail, there are many variations that come within the spirit and scope of the invention. For example, the invention can be implemented with other phase and pole number combinations and other switching circuits. Accordingly, the invention is to be limited only as particularly defined in the appended claims.

I claim:

1. A switched reluctance system comprising:

a switched reluctance machine including a stator having a plurality of stator poles, a rotor having a plurality of rotor poles, the rotor being rotatably positioned with respect to the stator, and at least one phase winding associated with at least one stator pole, wherein rotation of the rotor produces cyclic variations in the inductance of the at least one phase winding and wherein each cyclic variation in the at least one phase winding's inductance defines a phase period corresponding to the angle of rotor rotation required for one cyclic variation;

a controller coupled to provide firing signals that control the energization of the phase winding;

at least one switch adapted to couple the at least one phase winding to a source of electric power to energize the at least one phase winding in response to the firing signals from the controller, wherein the firing signals provided by the controller are such that the least one phase winding is coupled to the source of electric power over an angular period that is greater than 50% of the phase period such that the current in the phase winding is continuous over at least one complete phase period.

2. The switched reluctance system of claim 1 wherein the rotor has a first angular position and a second angular position and wherein the controller provides firing signals to operate the switch to couple the at least one phase winding to the source of electric power when the rotor reaches the first angular position and to de-couple the phase winding from the source of electric power when the rotor reaches the second angular position.

3. The switched reluctance system of claim 2 wherein the second angular position is independent of the rotational speed of the rotor.

4. The switched reluctance system of claim 2 wherein the second angular position varies as the rotational speed of the rotor increases.

5. The switched reluctance system of claim 2 wherein the controller receives a reference signal indicative of a desired output of the switched reluctance machine and wherein the controller adjusts the first angular position as a function of the reference signal.

6. The switched reluctance system of claim 5 wherein the controller operates the switched reluctance machine as a motor, wherein the reference signal corresponds to a desired torque output, and wherein the controller adjusts the first angular position such that the first angular position varies as the reference signal increases.

7. The switched reluctance motor system of claim 6 further comprising:

a speed detection circuit providing a rotor speed signal representative of the rotational speed of the rotor; and a comparator for comparing the rotor speed signal with a speed demand signal representative of the desired speed and providing a speed error signal that is proportional to the difference between the rotor speed signal and the speed demand signal, wherein the reference signal comprises the speed error signal.

8. The switched reluctance motor system of claim 7 wherein the speed error signal is applied to a P+I controller and wherein the output of the P+I controller is the reference signal.

9. The switched reluctance system of claim 5 wherein the controller operates the switched reluctance machine as a generator providing electric power, wherein the reference signal corresponds to a desired electric power output, and wherein the controller adjusts the first angular position such that the first angular position decreases as the reference signal increases.

10. The switched reluctance motor system of claim 9 wherein the electric output of the generator is provided to a battery and wherein the system further comprises:

a voltage detection circuit providing a battery voltage signal representative of the battery voltage; and a comparator for comparing the battery voltage signal with a voltage demand signal representative of the desired battery voltage and providing a voltage error signal that is proportional to the difference between the battery voltage signal and the voltage demand signal, wherein the reference signal comprises the voltage error signal.

11. The switched reluctance motor system of claim 10 wherein the voltage error signal is applied to a P+I controller and wherein the output of the P+I controller is the reference signal.

12. The switched reluctance system of claim 5 wherein the controller comprises:

a rotor position detector providing rotor position signals representative of the angular position of the rotor relative to the stator;

a speed detector providing a speed signal representative of the angular speed of the rotor;

a control law circuit that receives the speed signal and the reference signal and generates in response a first control signal corresponding to the first angular position and a second signal corresponding to the second angular position;

comparator circuitry that receives the rotor position signals, the first control signal and the second control signal, wherein the comparator circuitry compares the rotor position signals with the first and second control signals and generates a firing signal whenever the rotor position signal and the first and the second control signals indicate that the rotor is at an angular position between the first and second angular positions.

13. The switched reluctance system of claim 12 wherein the control law circuit is a programmable memory.

14. The switched reluctance system of claim 12 wherein the rotor position detector comprises a position transducer.

15. A method of controlling a switched reluctance motor in response to a speed command corresponding to a desired rotor speed, the switched reluctance motor including a stator pole, at least one phase winding associated with the stator pole, and a rotor having a plurality of rotor poles, rotation of the rotor producing cyclic variations in the inductance of the at least one phase winding and the cyclic variations in the inductance of the at least one phase winding defining a phase period corresponding to the angle of rotor rotation required for one cycle of phase inductance variation, the method comprising the steps of:

monitoring the rotational speed of the rotor;

comparing the rotational speed of the rotor to the desired rotor speed;

energizing the phase winding such that the current in the phase winding is continuous over an interval defined by the alignment of adjacent rotor poles with the said stator pole when the rotational speed of the rotor is less than the desired rotor speed; and for each phase period, energizing the phase winding over an angular period approximately equal to 50% of the phase period when the rotational speed of the rotor is equal to the desired rotor speed.

16. The method of claim 15 further comprising the step of energizing the at least one phase winding such that the current in the at least one phase winding is discontinuous over a complete revolution of the rotor when the rotational speed of the rotor is greater than the desired rotor speed.

17. The method of claim 15 further comprising the step of energizing the at least one phase winding over an angular period that is greater than 50% of the phase period when the rotational speed of the rotor is less than the desired rotor speed.

18. A method of controlling a switched reluctance generator coupled to a charge storage device in response to a voltage command corresponding to a desired voltage across the storage device, the switched reluctance motor including a stator pole, at least one phase winding associated with the stator pole, and a rotor having a plurality of rotor poles, the method comprising the steps of:

monitoring the voltage across the storage device;

comparing the voltage across the storage device with the desired voltage; and energizing the at least one phase winding such that the current in the at least one phase winding is continuous when the voltage across the storage device is less than the desired voltage.

19. The method of claim 18 wherein rotation of the rotor produces cyclic variations in the inductance of the at least one phase winding and wherein the cyclic variations in the inductance of the at least one phase winding define a phase period corresponding to the angle of rotor rotation required for one cycle of phase inductance variation, further comprising the step of, for each phase period, energizing the at least one phase winding over an angular period approximately equal to 50% of the phase period when the voltage across the storage device is equal to the desired voltage.

20. The method of claim 18 further comprising the step of energizing the at least one phase winding over an angular period that is greater than 50% of the phase period when the voltage across the storage device is less than the desired voltage.

* * * * *

UNITED STATES PATENT AND TRADEMARK OFFICE
CERTIFICATE OF CORRECTION

PATENT NO. : 5,563,488
DATED : October 8, 1996
INVENTOR(S) : John M. Stephenson

It is certified that error appears in the above-indentified patent and that said Letters Patent is hereby corrected as shown below:

The following should have appeared on the title page;
–[30]    Foreign Application Priority Data
  Sept. 25, 1991 [GB] United Kingdom ............GB 9120404.0.--

Figure 1C:
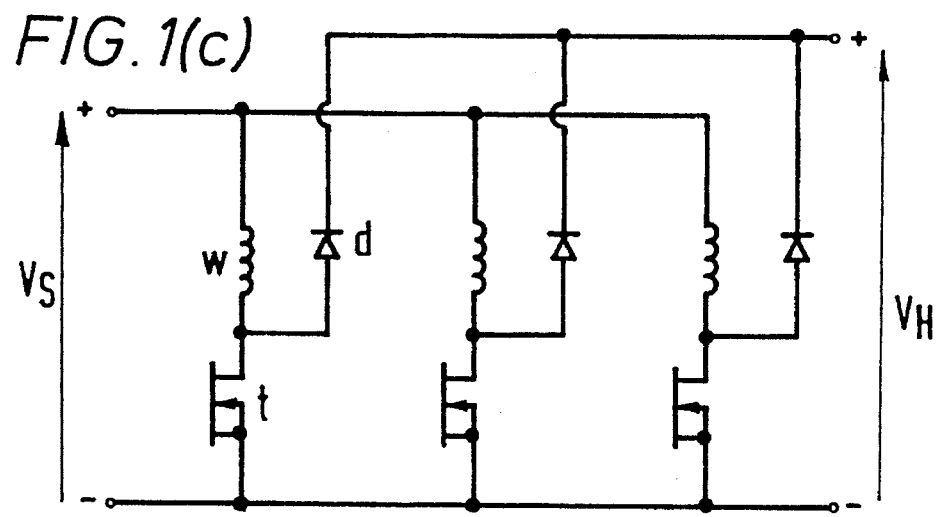
Figure 2B:
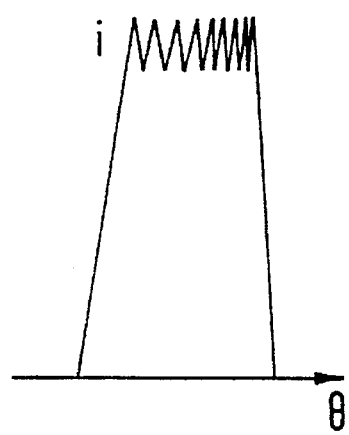
Figure 3A:
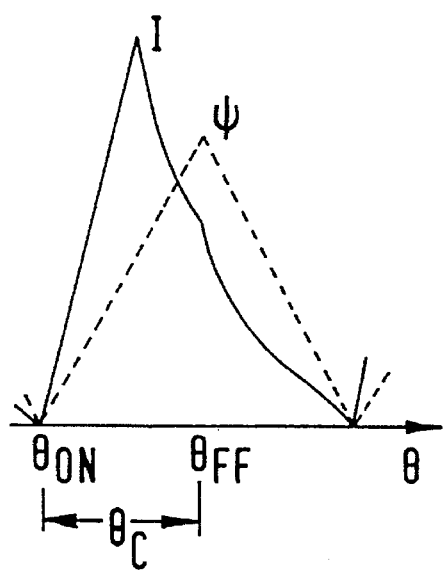
Figure 3B:
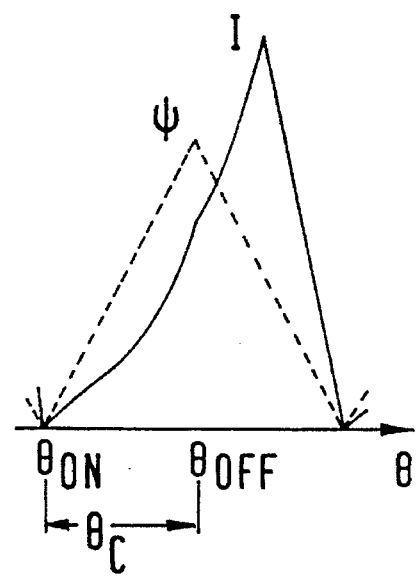

At column 5, line 1, the following should be inserted before line 1:

--Figures 1 (a) to (c) illustrate a typical 3-phase switched reluctance (SR) machine and common electronic switching circuits which may be used to control the machine;

Figures 2 (a) and (b) illustrate typical motoring and generating phase winding current waveforms, respectively, without freewheeling;

Figures 3 (a) and (b) illustrate phase winding currents for motoring and generating operation;--

Column 7, line 41, change numerals 6 and 4 from bold to normal type set.

Between Column 6, line 32 and Column 7, line 16, each instance of "O" should be --$\theta$--.

Column 8, line 16, "O" should be --$\theta$--.
Column 8, line 24, "a" should be --as--.

UNITED STATES PATENT AND TRADEMARK OFFICE
CERTIFICATE OF CORRECTION

PATENT NO. : 5,563,488
DATED : October 8, 1996
INVENTOR(S) : John M. Stephenson

Page 2 of 2

It is certified that error appears in the above-indentified patent and that said Letters Patent is hereby corrected as shown below:

Column 9, line 4, "I" should be --We--.

Signed and Sealed this

Twelfth Day of August, 1997

Attest:

BRUCE LEHMAN

Attesting Officer

Commissioner of Patents and Trademarks